(12) United States Patent
Korhonen et al.

(10) Patent No.: US 12,309,876 B2
(45) Date of Patent: May 20, 2025

(54) COMMUNICATION SYSTEM

(71) Applicant: NOKIA TECHNOLOGIES OY, Espoo (FI)

(72) Inventors: Juha Sakari Korhonen, Espoo (FI); Esa Tapani Tiirola, Oulu (FI); Henri Markus Koskinen, Espoo (FI); Esa Mikael Malkamäki, Espoo (FI); Ilkka Antero Keskitalo, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 313 days.

(21) Appl. No.: 17/795,435

(22) PCT Filed: Jan. 30, 2020

(86) PCT No.: PCT/EP2020/052278
§ 371 (c)(1),
(2) Date: Jul. 26, 2022

(87) PCT Pub. No.: WO2021/151490
PCT Pub. Date: Aug. 5, 2021

(65) Prior Publication Data
US 2023/0064251 A1    Mar. 2, 2023

(51) Int. Cl.
*H04W 8/00* (2009.01)
*H04W 24/10* (2009.01)
*H04W 64/00* (2009.01)

(52) U.S. Cl.
CPC .......... *H04W 8/005* (2013.01); *H04W 24/10* (2013.01); *H04W 64/00* (2013.01)

(58) Field of Classification Search
CPC ..... H04W 8/005; H04W 24/10; H04W 64/00; H04W 40/24; H04W 48/16; H04W 24/02;
(Continued)

(56) References Cited

U.S. PATENT DOCUMENTS

| 2017/0265189 A1* | 9/2017 | Stephenne | ............ H04W 72/51 |
| 2020/0229115 A1* | 7/2020 | Qi | .......................... H04W 80/08 |

(Continued)

FOREIGN PATENT DOCUMENTS

| EP | 3 429 275 A1 | 1/2019 |
| WO | 2014/111154 A1 | 7/2014 |

(Continued)

OTHER PUBLICATIONS

ZTE, "Discussion on IAB node initial access process", 3GPP TSG RAN WG1 Meeting #93, R1-1806026 (Year: 2018).*
(Continued)

*Primary Examiner* — Ayaz R Sheikh
*Assistant Examiner* — Mang Boi Thawng
(74) *Attorney, Agent, or Firm* — Lippes Mathias LLP

(57) ABSTRACT

There is disclosed method for a network apparatus, the method comprising configuring the network apparatus to use a first transmit and/or receive pattern selected from a plurality of available transmit and/or receive patterns for performing discovery procedures with another network apparatus, wherein the first transmit and/or receive pattern is selected from said plurality in dependence on at least the mobility of said network apparatus and/or on the relative mobility of said network apparatus to said another network apparatus.

18 Claims, 11 Drawing Sheets

(58) Field of Classification Search
CPC . H04W 36/0083; H04W 72/54; H04W 24/08; H04W 84/047; H04L 41/5058; H04L 67/51; H04L 67/75; H04B 7/0695; H04B 7/088

See application file for complete search history.

(56) References Cited

U.S. PATENT DOCUMENTS

| | | | | |
|---|---|---|---|---|
| 2020/0344589 | A1* | 10/2020 | Tiirola | H04W 72/51 |
| 2021/0014777 | A1* | 1/2021 | You | H04W 40/24 |
| 2021/0058917 | A1* | 2/2021 | Abedini | H04W 72/51 |
| 2022/0104152 | A1* | 3/2022 | Wu | H04L 5/0046 |
| 2022/0116104 | A1* | 4/2022 | Liu | H04L 5/0082 |
| 2022/0256485 | A1* | 8/2022 | Dortschy | H04L 5/0035 |
| 2022/0303924 | A1* | 9/2022 | Dahlman | H04L 5/0032 |

FOREIGN PATENT DOCUMENTS

| | | | | |
|---|---|---|---|---|
| WO | WO-2015176758 | A1 * | 11/2015 | H04L 1/0057 |
| WO | 2018/218098 | A1 | 11/2018 | |

OTHER PUBLICATIONS

Qualcomm, "Inter-IAB-node discovery", 3GPP TSG RAN WG1 Meeting #93, R1-1807395 (Year: 2018).*

LG, "Discussions on discovery among NR IAB nodes", 3GPP TSG RAN WG1 Meeting #94, R1-1808513 (Year: 2018).*

AT&T, Summary of 7.2.3.1 Enhancements to support NR backhaul links, 3GPP TSG RAN WG1 Meeting #94, R1-1809941 (Year: 2018).*

Nokia, "Discovery and measurement for IAB", 3GPP TSG RAN WG1 Meeting #94-bis, R1-1810677 (Year: 2018).*

NTT Docomo, "Extensions of SSBs for inter-IAB-node discovery and measurements", 3GPP TSG RAN WG1 Ad-Hoc Meeting 1901, R1-1900958 (Year: 2019).*

Samsung, "Support of SSBs for IAB Node Discovery and Measurement", 3GPP TSG RAN WG1 Ad-Hoc Meeting 1901, R1-1901043 (Year: 2019).*

Qualcomm, Summary of section 7.2.32—SSB extensions for IAB, 3GPP TSG RAN WG1 Meeting AH1901, R1-1901369 (Year: 2019).*

Lenovo, "Discussion on discovery and measurement for IAB network", 3GPP TSG RAN WG1 #96, R1-1902154 (Year: 2019).*

Ericsson, SSB-Based IAB node discovery and measurement, 3GPP TSG-RAM WG1 #96, R1-1902410 (Year: 2019).*

Intel, "SSBs for Inter-IAB Node Discovery and Measurements", 3GPP TSG RAN WG1 #96bis, R1-1904290 (Year: 2019).*

Huawei, "SSB-based discovery and measurement for IAB", 3GPP TSG RAN WG1 Meeting #97, R1-1906000 (Year: 2019).*

Ericsson, "SSB-based IAB node discovery and measurement", 3GPP TSG-RAN WG1 #97, R1-1906589 (Year: 2019).*

Nokia, "Measurements for IAB", 3GPP TSG-RAN WG2 Meeting #101 bis, R2-1807723 (Year: 2018).*

Nokia, "IAB node discovery and monitoring", 3GPP TSG-RAN WG2 Meeting #103bis, R2-1814997 (Year: 2018).*

International Search Report and Written Opinion dated Oct. 5, 2020 corresponding to International Patent Application No. PCT/EP2020/052278.

Cristina Perfecto et al., "Millimeter Wave V2V Communications: Distributed Association and Beam Alignment," Arxiv.org, Dec. 13, 2016, XP080743932.

Junyi Wang et al., "Beam Codebook Based Beamforming Protocol for Multi-Gbps Millimeter-Wave WPAN Systems," IEEE Journal on Selected Areas in Communications, vol. 27, No. 8, Oct. 1, 2009, pp. 1390-1399, XP011277425.

Qualcomm, "New WID: Integrated Access and Backhaul for NR," 3GPP Draft, RP-182322, 3GPP TSG RAN Meeting #82, Sorrento, Italy, Dec. 10-13, 2018.

Qualcomm, "New WID: Integrated Access and Backhaul for NR," 3GPP Draft; RP-182882, 3GPP TSG RAN Meeting #32, Sorrento, Italy, Dec. 10-13, 2018.

* cited by examiner

Figure 12

COMMUNICATION SYSTEM

FIELD

The present application relates to a method, apparatus, and computer program.

BACKGROUND

A communication system can be seen as a facility that enables communication sessions between two or more entities such as user terminals, base stations/access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to a first aspect, there is provided a network apparatus comprising: means for configuring the network apparatus to use a first transmit and/or receive pattern selected from a plurality of available transmit and/or receive patterns for performing discovery procedures with another network apparatus, wherein the first transmit and/or receive pattern is selected from said plurality in dependence on at least the mobility of said network apparatus and/or on the relative mobility of said network apparatus to said another network apparatus.

The network apparatus may be a mobile network access apparatus and the another network apparatus may be a stationary network apparatus. The network apparatus may further comprise: means for measuring the presence of at least one stationary network apparatus using said first transmit and/or receive pattern to obtain at least one measurement result; and means for providing at least one measurement result to the core network apparatus. The network apparatus may further comprise: means for providing a backhaul connection to the core network, and wherein said means for providing comprises means for providing the at least one measurement result directly to a stationary network apparatus facilitating the backhaul connection to the core network.

The network apparatus may be a mobile network access apparatus and the first transmit and/or receive pattern may comprise only receive time windows.

Said means for providing may comprise means for providing the at least one measurement result to a mobile network apparatus providing a backhaul connection to the core network.

The network apparatus may be a mobile network access apparatus and the first transmit and/or receive pattern may have time resources that are orthogonal to a time resources of a transmit and/or receive pattern used by the another network apparatus. The network apparatus may further comprise: means for measuring a presence of mobile network apparatuses travelling as part of a group; and means for providing the measurement results to at least one network apparatus configured to provide the backhaul connection to the core network.

The network apparatus may be a stationary network apparatus and the another network apparatus may be a mobile network apparatus. The network apparatus may further comprise: means for providing a backhaul connection to the core network; and: means for receiving at least one measurement result directly from a mobile network apparatus facilitating the backhaul connection to a core network.

The network apparatus may further comprise means for receiving an indication of the first transmit and/or receive pattern from a core network apparatus.

According to a second aspect, there is provided a network apparatus comprising: means for receiving a first discovery pattern specific for at least one mobile network access apparatus; means for measuring the presence of at least one static network apparatus based on the first pattern; and means for providing the measurement results to at least one network apparatus providing a backhaul connection(s) to a fixed network.

The at least one mobile network access apparatus may be configured with at least one synchronisation signal block transmission configuration different and/or orthogonal to at least one synchronisation signal block transmission configuration used by the fixed network. The configured at least one synchronisation signal block transmission configuration may be part of a second discovery pattern used for measuring the presence of other mobile network access apparatuses travelling together; the network apparatus further comprising: means for measuring the presence of other mobile network access apparatuses travelling together based on the second discovery pattern to produce measurement results; and means for providing the measurement results to the at least one network apparatus providing the backhaul connection(s) to the fixed network. The first discovery pattern may be all receive time slots.

The at least one mobile network access apparatus may be configured with at least one synchronisation signal block transmission configuration pattern specific for mobile network access apparatus.

According to a third aspect, there is provided a method for a network apparatus comprising: configuring the network apparatus to use a first transmit and/or receive pattern selected from a plurality of available transmit and/or receive patterns for performing discovery procedures with another network apparatus, wherein the first transmit and/or receive pattern is selected from said plurality in dependence on at least the mobility of said network apparatus and/or on the relative mobility of said network apparatus to said another network apparatus.

The network apparatus may be a mobile network access apparatus and the another network apparatus may be a stationary network apparatus. The method may further comprise: measuring the presence of at least one stationary network apparatus using said first transmit and/or receive pattern to obtain at least one measurement result; and providing at least one measurement result to the core network apparatus. The method may further comprise: providing a backhaul connection to the core network, and wherein said providing comprises providing the at least one measurement result directly to a stationary network apparatus facilitating the backhaul connection to the core network.

The network apparatus may be a mobile network access apparatus and the first transmit and/or receive pattern may comprise only receive time windows.

Said providing may comprise providing the at least one measurement result to a mobile network apparatus providing a backhaul connection to the core network.

The network apparatus may be a mobile network access apparatus and the first transmit and/or receive pattern may have time resources that are orthogonal to time resources of a transmit and/or receive pattern used by the another network apparatus. The method may further comprise: measuring a presence of mobile network apparatuses travelling as part of a group; and providing the measurement results to at least one network apparatus configured to provide the backhaul connection to the core network.

The network apparatus may be a stationary network apparatus and the another network apparatus may be a mobile network apparatus. The method may further comprise: providing a backhaul connection to the core network; and receiving at least one measurement result directly from a mobile network apparatus facilitating the backhaul connection to a core network.

The method may further comprise receiving an indication of the first transmit and/or receive pattern from a core network apparatus.

According to a fourth aspect, there is provided a method for a network apparatus, the method comprising: receiving a first discovery pattern specific for at least one mobile network access apparatus; measuring the presence of at least one static network apparatus based on the first pattern; and providing the measurement results to at least one network apparatus providing a backhaul connection(s) to a fixed network.

The at least one mobile network access apparatus may be configured with at least one synchronisation signal block transmission configuration different and/or orthogonal to at least one synchronisation signal block transmission configuration used by the fixed network. The configured at least one synchronisation signal block transmission configuration may be part of a second discovery pattern used for measuring the presence of other mobile network access apparatuses travelling together; the method further comprising: measuring the presence of other mobile network access apparatuses travelling together based on the second discovery pattern to produce measurement results; and providing the measurement results to the at least one network apparatus providing the backhaul connection(s) to the fixed network. The first discovery pattern may be all receive time slots.

The at least one mobile network access apparatus may be configured with at least one synchronisation signal block transmission configuration pattern specific for mobile network access apparatus.

According to a fifth aspect, there is provided a network apparatus comprising at least one processor and at least one memory comprising computer code that, when run on the at least one processor, causes the network apparatus to: configure the network apparatus to use a first transmit and/or receive pattern selected from a plurality of available transmit and/or receive patterns for performing discovery procedures with another network apparatus, wherein the first transmit and/or receive pattern is selected from said plurality in dependence on at least the mobility of said network apparatus and/or on the relative mobility of said network apparatus to said another network apparatus.

The network apparatus may be a mobile network access apparatus and the another network apparatus may be a stationary network apparatus. The network apparatus may further be caused to: measure the presence of at least one stationary network apparatus using said first transmit and/or receive pattern to obtain at least one measurement result; and provide at least one measurement result to the core network apparatus. The network apparatus may further be caused to: provide a backhaul connection to the core network, and wherein said providing comprises providing the at least one measurement result directly to a stationary network apparatus facilitating the backhaul connection to the core network.

The network apparatus may be a mobile network access apparatus and the first transmit and/or receive pattern may comprise only receive time windows.

Said providing may comprise providing the at least one measurement result to a mobile network apparatus providing a backhaul connection to the core network.

The network apparatus may be a mobile network access apparatus and the first transmit and/or receive pattern may have time resources that are orthogonal to time resources of a transmit and/or receive pattern used by the another network apparatus. The network apparatus may further be caused to: measure a presence of mobile network apparatuses travelling as part of a group; and provide the measurement results to at least one network apparatus configured to provide the backhaul connection to the core network.

The network apparatus may be a stationary network apparatus and the another network apparatus may be a mobile network apparatus. The network apparatus may further be caused to: provide a backhaul connection to the core network; and receive at least one measurement result directly from a mobile network apparatus facilitating the backhaul connection to a core network.

The network apparatus may further be caused to receive an indication of the first transmit and/or receive pattern from a core network apparatus.

According to a sixth aspect, there is provided there is provided a network apparatus comprising at least one processor and at least one memory comprising computer code that, when run on the at least one processor, causes the network apparatus to: receive a first discovery pattern specific for at least one mobile network access apparatus; measure the presence of at least one static network apparatus based on the first pattern; and provide the measurement results to at least one network apparatus providing a backhaul connection(s) to a fixed network.

The at least one mobile network access apparatus may be configured with at least one synchronisation signal block transmission configuration different and/or orthogonal to at least one synchronisation signal block transmission configuration used by the fixed network. The configured at least one synchronisation signal block transmission configuration may be part of a second discovery pattern used for measuring the presence of other mobile network access apparatuses travelling together; the network apparatus may further be caused to: measure the presence of other mobile network access apparatuses travelling together based on the second discovery pattern to produce measurement results; and provide the measurement results to the at least one network apparatus providing the backhaul connection(s) to the fixed network. The first discovery pattern may be all receive time slots.

The at least one mobile network access apparatus may be configured with at least one synchronisation signal block transmission configuration pattern specific for mobile network access apparatus.

According to a seventh aspect, there is provided a network apparatus comprising: configuring circuitry for configuring the network apparatus to use a first transmit and/or receive pattern selected from a plurality of available transmit and/or receive patterns for performing discovery procedures with another network apparatus, wherein the first transmit and/or receive pattern is selected from said plurality in dependence on at least the mobility of said network apparatus and/or on the relative mobility of said network apparatus to said another network apparatus.

The network apparatus may be a mobile network access apparatus and the another network apparatus may be a stationary network apparatus. The network apparatus may further comprise: measuring circuitry for measuring the presence of at least one stationary network apparatus using said first transmit and/or receive pattern to obtain at least one measurement result; and providing circuitry for providing at least one measurement result to the core network apparatus. The network apparatus may further comprise: providing circuitry for providing a backhaul connection to the core network, and wherein said providing circuitry comprises providing circuitry for providing the at least one measurement result directly to a stationary network apparatus facilitating the backhaul connection to the core network.

The network apparatus may be a mobile network access apparatus and the first transmit and/or receive pattern may comprise only receive time windows.

Said providing circuitry may comprise providing circuitry for providing the at least one measurement result to a mobile network apparatus providing a backhaul connection to the core network.

The network apparatus may be a mobile network access apparatus and the first transmit and/or receive pattern may have time resources that are orthogonal to time resources of a transmit and/or receive pattern used by the another network apparatus. The network apparatus may further comprise: measuring circuitry for measuring a presence of mobile network apparatuses travelling as part of a group; and providing circuitry for providing the measurement results to at least one network apparatus configured to provide the backhaul connection to the core network.

The network apparatus may be a stationary network apparatus and the another network apparatus may be a mobile network apparatus. The network apparatus may further comprise: providing circuitry for providing a backhaul connection to the core network; and: receiving circuitry for receiving at least one measurement result directly from a mobile network apparatus facilitating the backhaul connection to a core network.

The network apparatus may further comprise receiving circuitry for receiving an indication of the first transmit and/or receive pattern from a core network apparatus.

According to an eighth aspect, there is provided a network apparatus comprising: receiving circuitry for receiving a first discovery pattern specific for at least one mobile network access apparatus; measuring circuitry for measuring the presence of at least one static network apparatus based on the first pattern; and providing circuitry for providing the measurement results to at least one network apparatus providing a backhaul connection(s) to a fixed network.

The at least one mobile network access apparatus may be configured with at least one synchronisation signal block transmission configuration different and/or orthogonal to at least one synchronisation signal block transmission configuration used by the fixed network. The configured at least one synchronisation signal block transmission configuration may be part of a second discovery pattern used for measuring the presence of other mobile network access apparatuses travelling together; the network apparatus further comprising: measuring circuitry for measuring the presence of other mobile network access apparatuses travelling together based on the second discovery pattern to produce measurement results; and providing circuitry for providing the measurement results to the at least one network apparatus providing the backhaul connection(s) to the fixed network. The first discovery pattern may be all receive time slots.

The at least one mobile network access apparatus may be configured with at least one synchronisation signal block transmission configuration pattern specific for mobile network access apparatus.

According to a ninth aspect, there is provided a computer program comprising program instructions for causing a computer to perform any method as described above.

According to a tenth aspect, there is provided a computer program product stored on a medium may cause an apparatus to perform any method as described herein.

According to an eleventh aspect, there is provided an electronic device that may comprise apparatus as described herein.

According to a twelfth aspect, there is provided a chipset that may comprise an apparatus as described herein.

According to a thirteenth aspect, there is provided non-transitory computer readable medium comprising program instructions for causing an apparatus to perform at least the following: configure the network apparatus to use a first transmit and/or receive pattern selected from a plurality of available transmit and/or receive patterns for performing discovery procedures with another network apparatus, wherein the first transmit and/or receive pattern is selected from said plurality in dependence on at least the mobility of said network apparatus and/or on the relative mobility of said network apparatus to said another network apparatus.

The network apparatus may be a mobile network access apparatus and the another network apparatus may be a stationary network apparatus. The network apparatus may further be caused to: measure the presence of at least one stationary network apparatus using said first transmit and/or receive pattern to obtain at least one measurement result; and provide at least one measurement result to the core network apparatus. The network apparatus may further be caused to: provide a backhaul connection to the core network, and wherein said providing comprises providing the at least one measurement result directly to a stationary network apparatus facilitating the backhaul connection to the core network.

The network apparatus may be a mobile network access apparatus and the first transmit and/or receive pattern may comprise only receive time windows.

Said providing may comprise providing the at least one measurement result to a mobile network apparatus providing a backhaul connection to the core network.

The network apparatus may be a mobile network access apparatus and the first transmit and/or receive pattern may have time resources that are orthogonal to time resources of a transmit and/or receive pattern used by the another network apparatus. The network apparatus may further be caused to: measure a presence of mobile network apparatuses travelling as part of a group; and provide the measurement results to at least one network apparatus configured to provide the backhaul connection to the core network.

The network apparatus may be a stationary network apparatus and the another network apparatus may be a mobile network apparatus. The network apparatus may further be caused to: provide a backhaul connection to the core network; and receive at least one measurement result directly from a mobile network apparatus facilitating the backhaul connection to a core network.

The network apparatus may further be caused to receive an indication of the first transmit and/or receive pattern from a core network apparatus.

According to a fourteenth aspect, there is provided non-transitory computer readable medium comprising program instructions for causing an apparatus to perform at least the following: receive a first discovery pattern specific for at least one mobile network access apparatus; measure the presence of at least one static network apparatus based on the first pattern; and provide the measurement results to at least one network apparatus providing a backhaul connection(s) to a fixed network.

The at least one mobile network access apparatus may be configured with at least one synchronisation signal block transmission configuration different and/or orthogonal to at least one synchronisation signal block transmission configuration used by the fixed network. The configured at least one synchronisation signal block transmission configuration may be part of a second discovery pattern used for measuring the presence of other mobile network access apparatuses travelling together; the network apparatus may further be caused to: measure the presence of other mobile network access apparatuses travelling together based on the second discovery pattern to produce measurement results; and provide the measurement results to the at least one network apparatus providing the backhaul connection(s) to the fixed network. The first discovery pattern may be all receive time slots.

The at least one mobile network access apparatus may be configured with at least one synchronisation signal block transmission configuration pattern specific for mobile network access apparatus.

According to a fifteenth aspect, there is provided a network apparatus comprising means for selecting a first transmit and/or receive pattern from a plurality of available transmit and/or receive patterns for a second network apparatus performing discovery procedures with a network apparatus, wherein the first transmit and/or receive pattern is selected from said plurality in dependence on at least the mobility of said network apparatus and/or on the relative mobility of said network apparatus to said another network apparatus, and means for configuring the second network apparatus with said first transmit and/or receive pattern.

The network apparatus may further comprise: means for providing a backhaul connection to the core network; and means for receiving at least one measurement result directly from a mobile network apparatus facilitating the backhaul connection to a core network.

The first transmit and/or receive pattern may comprise a smaller number of transmit time windows when the network apparatus is mobile compared to when the network apparatus is stationary, and wherein the first transmit and/or receive pattern may comprise a larger number of transmit time windows when the network apparatus is stationary compared to when the network apparatus is mobile.

According to a sixteenth aspect, there is provided a method for a network apparatus, the method comprising selecting a first transmit and/or receive pattern from a plurality of available transmit and/or receive patterns for a second network apparatus performing discovery procedures with a network apparatus, wherein the first transmit and/or receive pattern is selected from said plurality in dependence on at least the mobility of said network apparatus and/or on the relative mobility of said network apparatus to said another network apparatus, and configuring the second network apparatus with said first transmit and/or receive pattern.

The method may further comprise: providing a backhaul connection to the core network; and receive at least one measurement result directly from a mobile network apparatus facilitating the backhaul connection to a core network.

The first transmit and/or receive pattern may comprise a smaller number of transmit time windows when the network apparatus is mobile compared to when the network apparatus is stationary, and wherein the first transmit and/or receive pattern may comprise a larger number of transmit time windows when the network apparatus is stationary compared to when the network apparatus is mobile.

According to a seventeenth aspect, there is provided a network apparatus comprising at least one processor, and at least one memory comprising computer code that, when run on the at least one processor, causes the at network apparatus to: select a first transmit and/or receive pattern from a plurality of available transmit and/or receive patterns for a second network apparatus performing discovery procedures with a network apparatus, wherein the first transmit and/or receive pattern is selected from said plurality in dependence on at least the mobility of said network apparatus and/or on the relative mobility of said network apparatus to said another network apparatus, and configure the second network apparatus with said first transmit and/or receive pattern.

The network apparatus may further be caused to provide a backhaul connection to the core network; and receive at least one measurement result directly from a mobile network apparatus facilitating the backhaul connection to a core network.

The first transmit and/or receive pattern may comprise a smaller number of transmit time windows when the network apparatus is mobile compared to when the network apparatus is stationary, and wherein the first transmit and/or receive pattern may comprise a larger number of transmit time windows when the network apparatus is stationary compared to when the network apparatus is mobile.

According to an eighteenth aspect, non-transitory computer readable medium comprising program instructions for causing an apparatus to perform at least the following: select a first transmit and/or receive pattern from a plurality of available transmit and/or receive patterns for a second network apparatus performing discovery procedures with a network apparatus, wherein the first transmit and/or receive pattern is selected from said plurality in dependence on at least the mobility of said network apparatus and/or on the relative mobility of said network apparatus to said another network apparatus, and configure the second network apparatus with said first transmit and/or receive pattern.

The network apparatus may further be caused to perform at least the following: provide a backhaul connection to the core network; and receive at least one measurement result directly from a mobile network apparatus facilitating the backhaul connection to a core network.

The first transmit and/or receive pattern may comprise a smaller number of transmit time windows when the network apparatus is mobile compared to when the network apparatus is stationary, and wherein the first transmit and/or receive pattern may comprise a larger number of transmit time windows when the network apparatus is stationary compared to when the network apparatus is mobile.

According to a nineteenth aspect, there is provided a network apparatus comprising selecting circuitry for selecting a first transmit and/or receive pattern from a plurality of available transmit and/or receive patterns for a second network apparatus performing discovery procedures with a network apparatus, wherein the first transmit and/or receive pattern is selected from said plurality in dependence on at least the mobility of said network apparatus and/or on the relative mobility of said network apparatus to said another network apparatus, and configuring circuitry for configuring the second network apparatus with said first transmit and/or receive pattern.

The network apparatus may further comprise: providing circuitry for providing a backhaul connection to the core network; and receiving circuitry for receiving at least one measurement result directly from a mobile network apparatus facilitating the backhaul connection to a core network.

The first transmit and/or receive pattern may comprise a smaller number of transmit time windows when the network apparatus is mobile compared to when the network apparatus is stationary, and wherein the first transmit and/or receive pattern may comprise a larger number of transmit time windows when the network apparatus is stationary compared to when the network apparatus is mobile.

DESCRIPTION OF FIGURES

Examples will now be described, by way of example only, with reference to the accompanying Figures in which:

FIG. 12 shows example transmission patterns.

DETAILED DESCRIPTION

In general, the following disclosure relates to channel measurements made in a communication network. In particular, the following considers the effects that the mobility of at least one network apparatus might have on channel measurements, and proposes mechanisms for addressing these.

Particular attention in the following is paid to channel measurements for discovery purposes (i.e. for the detection of a network apparatus by another network apparatus). For example, the following considers discovery procedures for at least one moving (or "mobile") network apparatus discovering a stationary network apparatus hosting a backhaul connection to a core network. Discovery procedures are further considered for at least one moving network apparatus discovering at least one other moving network apparatus. For both of these discovery procedures, the following discloses how a selection of a particular/specific transmit and/or receive pattern may be used to facilitate discovery.

Although discovery procedures are primarily discussed in the above and the following (albeit not exclusively), it is understood that similar techniques may be applied in respect of making link measurements for other purposes, such as determining when handovers would be advantageously performed. Put simply, the following disclosure describes mechanisms for enabling measurements to be made. Those measurements may be used in any number of ways.

Further features of this are discussed below in examples.

Before explaining in detail the examples, certain general principles of a wireless communication system and mobile communication devices are briefly explained with reference to FIGS. 1 to 2 to assist in understanding the technology underlying the described examples.

Figure 1:
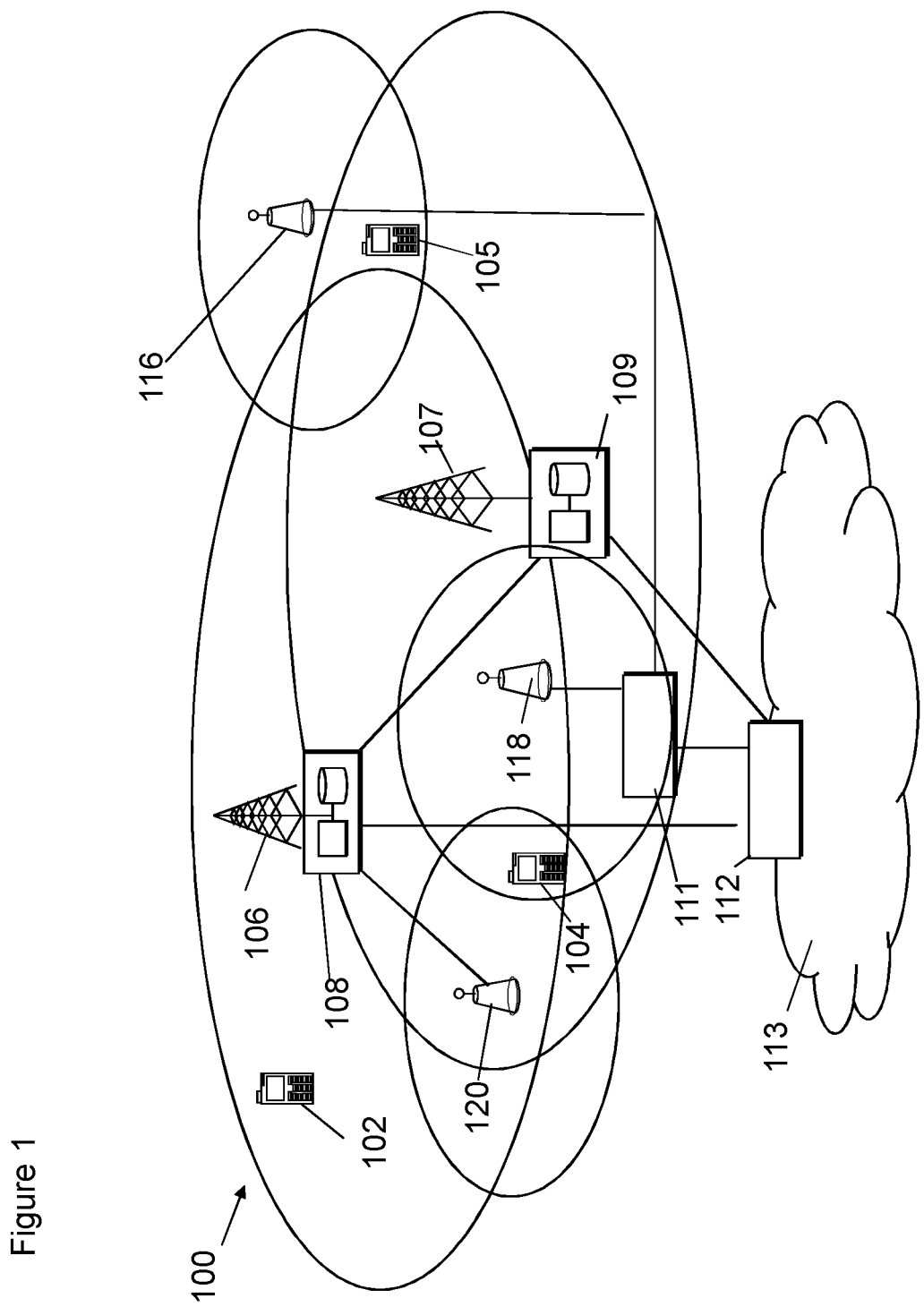
FIG. 1 shows a schematic diagram of an example communication system comprising a plurality of base stations and a plurality of communication devices.

In a wireless communication system 100, such as that shown in FIG. 1, mobile communication devices, user apparatus, or terminal 102, 104, 105 are provided wireless access via at least one base station or similar wireless transmitting and/or receiving node or point. A user can access the communication system by means of an appropriate communication device or terminal. A communication device of a user is often referred to as user equipment (UE) or as a user apparatus. Throughout the following, these terms will be used interchangeably. It is understood that the term "terminal" is used to cover communication devices that may access a network through an access node, and which may or may not have a user. Examples of such terminals without a user include devices that make machine-to-machine transmissions in a factory. A communication device is provided with an appropriate signal receiving and transmitting apparatus for enabling communications, for example enabling access to a communication network or communications directly with other users. The communication device may access a carrier provided by a station or access node, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. The LTE standard is developed by the 3rd Generation Partnership Project (3GPP). LTE was first released in 2008 (known as LTE Release 8), and new enhancements (in form of releases) has been introduced since then. LTE Release 13 and onwards is also known as LTE Advanced Pro. Another example of communications system is 5G system and New Radio (NR) radio interface, which is the latest 3GPP development.

A base station is referred to as an eNodeB (eNB) in LTE and as a gNodeB (gNB) in New Radio, and may be referred to more generally as simply a network apparatus or a network access node. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

3GPP systems may however be considered to have a so-called "flat" architecture, without the provision of RNCs; rather the (e)/(g)NB is in communication with a system architecture evolution gateway (SAE-GW) and a mobility management entity (MME), which entities may also be pooled meaning that a plurality of these nodes may serve a plurality (set) of (e)/(g)NBs. Each user apparatus is served by only one MME and/or S-GW at a time and the (e)/(g)NB keeps track of current association. SAE-GW is a "high-level" user plane core network element in LTE, which may comprise the S-GW and the P-GW (serving gateway and packet data network gateway, respectively). The functionalities of the S-GW and P-GW are separated, and they are not required to be co-located. For 5G systems, in the 5G core the above-mentioned network entities are denoted User Plane Function (UPF) and Access and Mobility Management Function (AMF). The UPF is in charge of the user plane connectivity in the core and the AMF is in charge of access-related control plane functions in the core.

In a 3GPP system, radio resource control (RRC) is defined to be a sublayer of radio interface Layer 3 that exists in the control plane only, and which provides information transfer service to the non-access stratum (an example is provided in 3GPP Technical Specification Group Services and System Aspects 21.905). RRC is a protocol layer between a user apparatus and a base station, and is in charge of, for example, paging the user apparatus when traffic comes, establishing/maintaining or release of radio links (establishing an RRC connection between user apparatus and (e)/(g) NB), user apparatus mobility, user apparatus measurement configuration and user apparatus reporting configuration, etc. RRC is also responsible for controlling the configuration of radio interface Layers 1 and 2.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst station 120 connects via the controller apparatus 108. In some examples, the smaller stations may not be provided. It is understood that this is just an example communication system, and other network structures may be defined by an operating communication protocol.

Figure 2:
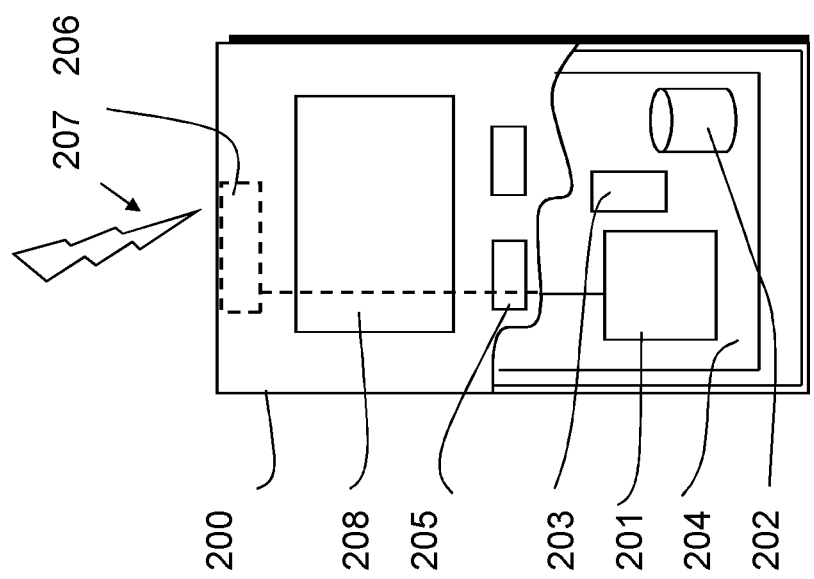
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment, apparatus or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. Other non-limiting examples include apparatuses that may be used for Industrial Internet of things applications, such as, for example, smart robotics, assembly devices, warehouse-based devices, intelligent logistics, etc. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information. It is understood that although a "mobile" communication device is referred to in the above and in the following, that the communication device may be stationary for extended periods of time.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the 5th Generation (5G) New Radio (NR). Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Figure 3:
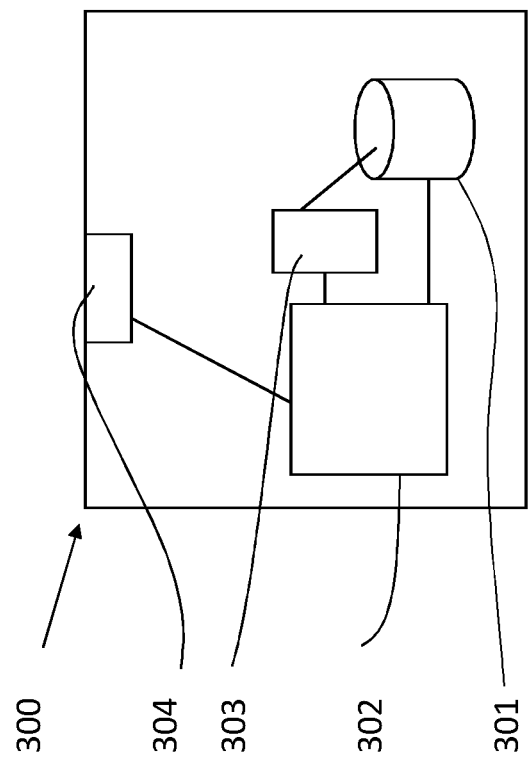
FIG. 3 shows a schematic diagram of an example network element.

An example network equipment for the 3GPP system is shown in FIG. 3. FIG. 3 shows an example of a control apparatus 300 for a communication system, for example to be coupled to and/or for controlling a station of an access system, such as a radio access network node, e.g. a base station or (g) node B, or a node of a core network such as an MME or Access and Mobility Management Function (AMF). The method may be implanted in a single control apparatus or across more than one control apparatus. The control apparatus may be integrated with or external to a node or module of a core network or radio access network. In some examples, base stations comprise a separate control apparatus unit or module. In other examples, the control apparatus can be another network element such as a radio network controller or a spectrum controller. In some examples, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example, the control apparatus 300 can be configured to execute an appropriate software code to provide the control functions. Control apparatus 300 may be included in a chipset or modem apparatus. A chipset or modem apparatus which includes apparatus 300 may be included in a control node such as a gNB.

It is understood that although the example network element is shown as a single apparatus, that the functions of the network element may be split amongst several distinct apparatuses. For example, the functions of a gNB may be split up into a centralised unit (labelled as gNB-CU) and at least one distributed unit (labelled as a gNB-DU). The centralised unit may host the radio resource control (RRC) layer, the Service Data Adaptation Protocol (SDAP) layer, and the Packet Data Convergence Protocol (PDCP) Layer. The distributed unit may host the radio link control (RLC) layer, the Medium Access Control (MAC) layer, and the Physical (PHY) layer. An interface, such as an F1 interface, may connect the gNB-CU with at least one of its gNB-DUs.

Figure 4:
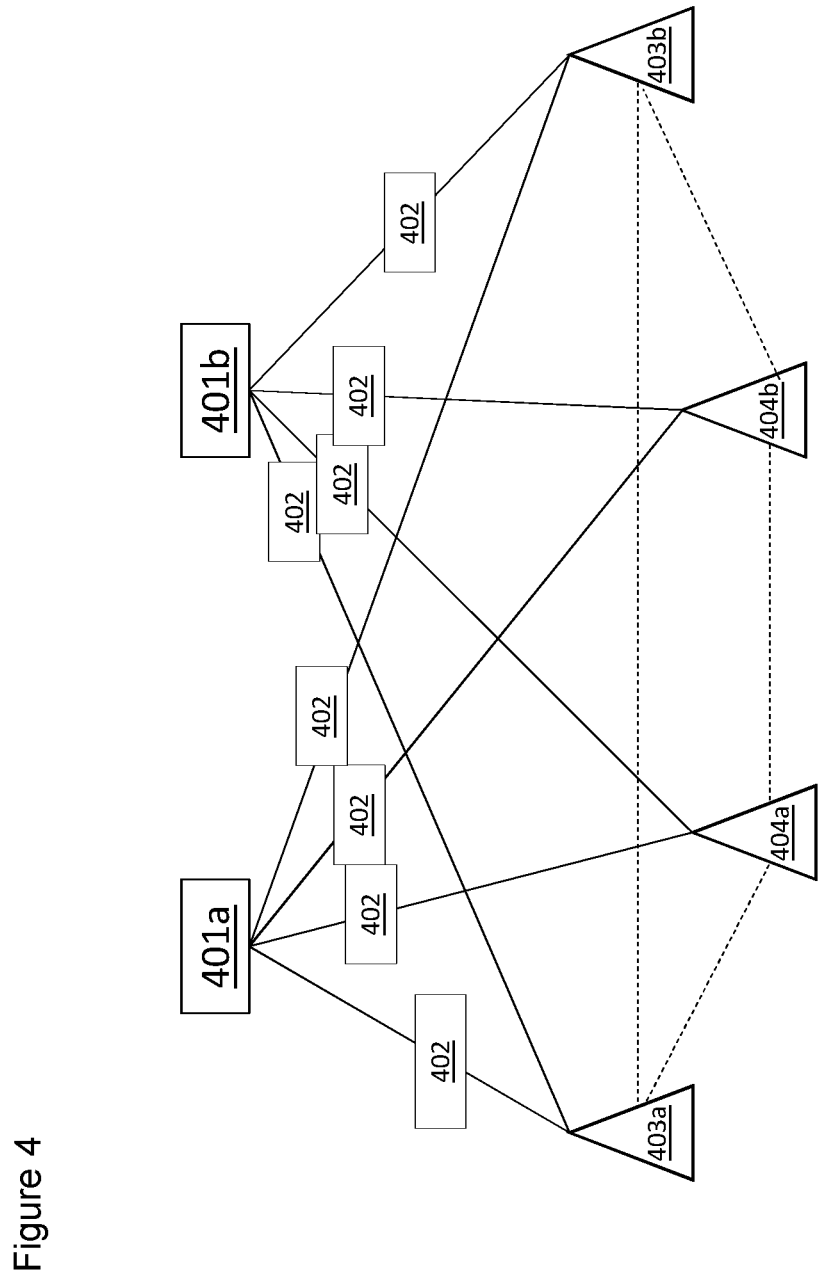
FIGS. 4 and 5 show schematic diagrams of example communication networks.

5G New Radio is a communication architecture and set of protocols defined by 3GPP (following 2G, 3G, 4G). FIG. 4 illustrates an example 5G network architecture.

FIG. 4 shows two access and mobility functions (AMFs) 401a, 401b that each provide respective interfaces/links (e.g. NG interfaces 402) to four base stations, 403a, 403b, 404a, 404b. The AMFs 401a, 401b may be considered to form part of the 5G core network part, whereas the base stations 403a, 403b, 404a, 404b may be considered to form part of the radio access network. Consequently, the respective interfaces/links 402 between the AMFs and the base station may be considered as backhaul interfaces/links. This is because a backhaul link may be considered to be a link between a radio access part of a communication network and a core network. In the following disclosure, the backhaul link considered is between an Integrated Access and Backhaul (IAB) node (discussed further below) and its parent node, which may be an IAB-donor gNB or another IAB node.

Two of the base stations shown in the example of FIG. 4 are gNBs 403a, 403b. Two of these base stations are ng-eNBs 404a, 404b, such as, for example, LTE base stations connected to a 5G core network. Each base station is shown as having at least one other link direct link to another base station. For example, gNB 403a has an interface to gNB 403b and to ng-eNB 404a. Ng-eNB 404a is shown as having an interface with gNB 403a and with ng-eNB 404b. Ng-eNB 404b is shown as having an interface with gNB 403b and with ng-eNB 404a. Communication devices (e.g. terminals/user devices) may access services through the core network via the radio access network part of the network. The gNB may thus be considered to provide user plane and control plane protocols towards a user equipment/terminal.

It is understood that, as discussed above in relation to FIG. 3, the gNB may be a single logical node/network access apparatus or may comprise a centralised unit and one or more distributed units.

Integrated access and backhaul (IAB) is being investigated in 5G to realise backhaul links for relaying network access traffic. Previously, backhaul/fronthaul traffic was transmitted using a fixed/wired connection such as, for example, using fibres. In contrast, IAB utilises part of a wireless spectrum in order to provide a backhaul/fronthaul connection for the IAB nodes to base stations connected to the core network. Therefore, by avoiding a need for wired connections, the use of IAB may help to reduce deployment costs when setting up a communication network.

When implementing IAB, it is desirable that the deployment of it is as automated as possible. In particular, as the coverage provided by the network may be problematic on higher frequency bands, specific capabilities may be developed for NR for facilitating effortless coverage extensions with minimized/no requirements for network (re-)planning in a fast and cost-effective manner. For these reasons, 3GPP is working to specify an IAB configuration that should be developed that enables wireless backhauling for NR sites that do not have fixed connections to the network ((e.g. wired/fibre connections). The usage of wireless connection for the backhaul/fronthaul communications eliminates the need for cabling of all of the sites in the deployed network. As the sites may be very dense, the use of wireless spectrum for backhaul/fronthaul communications would dramatically reduce the initial deployment costs. Wired backhaul connections are also not an option for moving relays, so greater architecture flexibility may be obtained through the use of wireless spectrum in this manner.

3GPP has explored discovery and measurement mechanisms in an IAB deployment. For example, see 3GPP RP-182882.

As discussed above, it is desirable that the 5G NR be allowed network deployment with minimized manual efforts and as automated self-configuration as possible, and that the IAB backhaul be compatible with wireless backhaul configurations.

It is also desirable that an IAB network supports concatenated relaying. Concatenated relaying occurs when the backhaul may be carried over multiple hops from one IAB node to another until the last network access apparatus serving the access UEs. The serving network access apparatus providing the backhaul connection to the IAB node may be called a parent network access apparatus. A parent network apparatus having a wired network connection to the core network may be called a donor network access apparatus. The donor network access apparatus may be configured to provide the backhaul connection to the core network for other network apparatuses that do not have a wired connection to the core network. Any network access apparatuses between the donor network access apparatus and the ultimate (served) IAB network access apparatus may be other IAB network access apparatus(es). The served IAB network access apparatus may be called a child network access apparatus.

Figure 5:
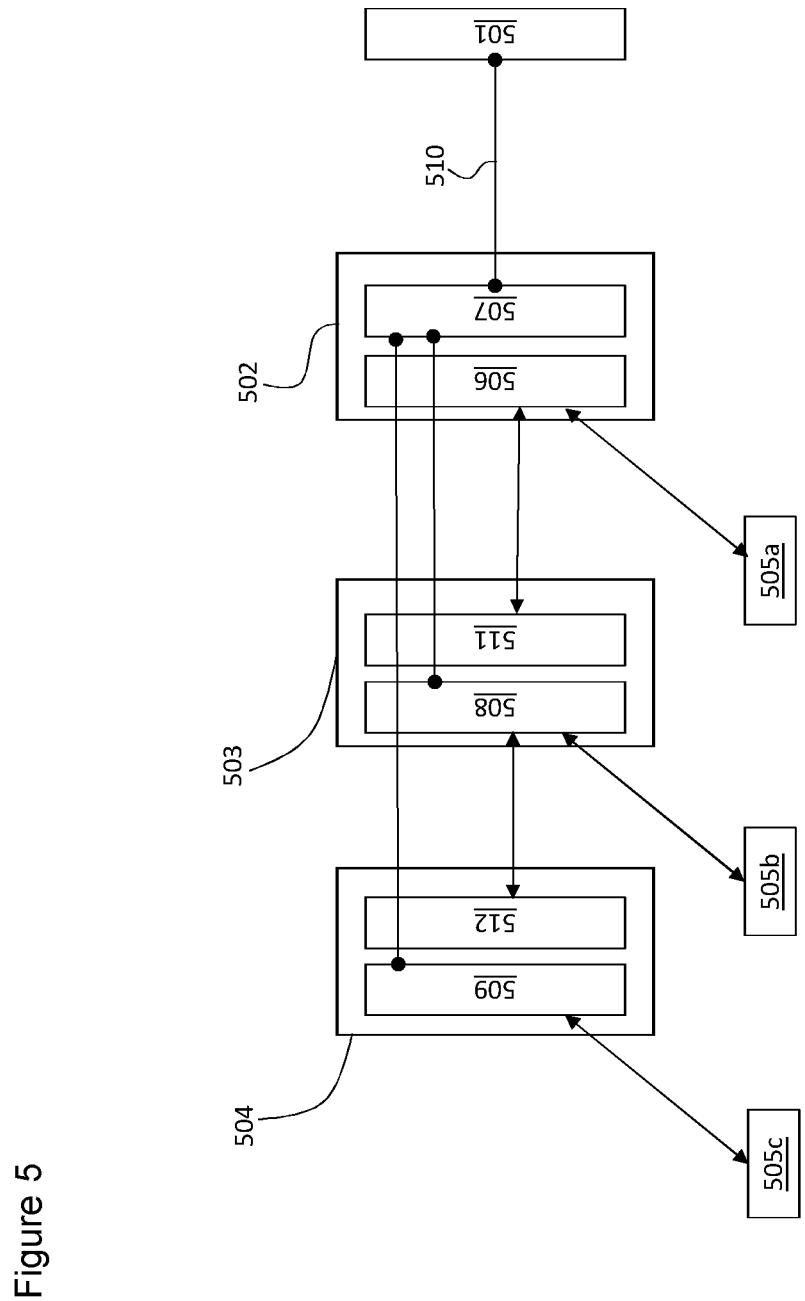

An example for the IAB architecture is illustrated with respect to FIG. 5, which schematically shows a high-level architecture for layer two relaying with distributed base station architecture. This architecture is also discussed in 3GPP RP-182322.

FIG. 5 shows a core network element 501, three access points 502, 503, 504, each access point being communicatively coupled to a respective terminal(s) 505a, 505b, 505c. Centralised Unit functionality may be comprised within a gNB, but not within an IAB node. Consequently, access points 503 and 504 may be considered as IAB nodes. The access point 502 may be a gNB. Access point 502 is the only access point shown that has a backhaul connection 510 with the core network element 501. Access point 502 is also shown as having interfaces to access points 503, 504 from a centralised unit 507. The centralised unit 507 may host the radio resource control (RRC) layer, the Service Data Adaptation Protocol (SDAP) layer, and the Packet Data Convergence Protocol (PDCP) Layer. Access point 502 also shows a distributed unit 506 that interfaces with a mobile termination part 511 of the access point 503 and terminal 505*a*. A mobile termination part is used by a mobile node to communicate with a parent node. This is in contrast with a distributed unit (such as 506, 508, 509 shown in FIG. 5), which is used to communicate with a child node or a user terminal. Access point 503 comprises a distributed unit 508 that interfaces with a mobile termination part 512 of access point 504 and terminal 505*b*. Access point 504 comprises a distributed unit 509 that interfaces with terminal 505*c*. The distributed unit may host the radio link control (RLC) layer, the Medium Access Control (MAC) layer, and the Physical (PHY) layer.

Discovery/measurements of other IAB network access apparatuses may be performed at two different stages. Stage 1 is during an initial discovery phase. Stage 2 is during operation, after at least one backhaul connection to the fixed network has been established (either directly, or indirectly via another IAB network apparatus).

For discovery during each of the phases, current 3GPP discussion has focused on the use of a Synchronisation Signal Block (SSB) signal for performing measurements for performing discovery procedures. It is, however, understood that other processes may be used for performing measurements, whether currently encapsulated by a 3GPP specification or not. For example, a Channel State Information-Reference Signal (CSI-RS) may be used for Stage 2 measurements/discovery. Sounding Reference Signal (SRS) is another exemplary signal suitable for measurements/discovery. However, for clarity and brevity, the following will only explicitly discuss SSB signals. It is understood, however, that this example is not limiting.

In Stage 1, an IAB network access apparatus (e.g. an access point) behaves largely like a terminal and finds the best or a good enough IAB network access apparatus that can provide a backhaul connection for it. As the network access apparatus is not serving terminals or other network access apparatuses during an initial discovery stage, the IAB network access apparatus is able to measure continuously for discovery.

Stage 2 applies after the IAB network access apparatus has started to serve terminals and other IAB network access apparatuses. In this case, the IAB network access apparatus still measures connections to earlier discovered network access apparatuses and try to discover new network access apparatuses. The purpose of these Stage 2 discovery and measurements is to prepare candidate connections that could be taken quickly in use. This may be, for example, in case the currently used backhaul connection is lost, or for cases when a better backhaul connection is found. A major difference between Stage 1 and 2 discovery is that in Stage 2 discovery, the measurement possibilities are limited by the half-duplex constraint as the network access apparatus is already serving user equipments/terminals and other IAB network access apparatuses. In other words, because the IAB network access apparatus is constrained not to transmit and receive in the same time period and the IAB network access apparatus is already transmitting and/or receiving with other devices, the IAB network access apparatus is limited in when it can make measurements on received transmissions.

Figure 6:
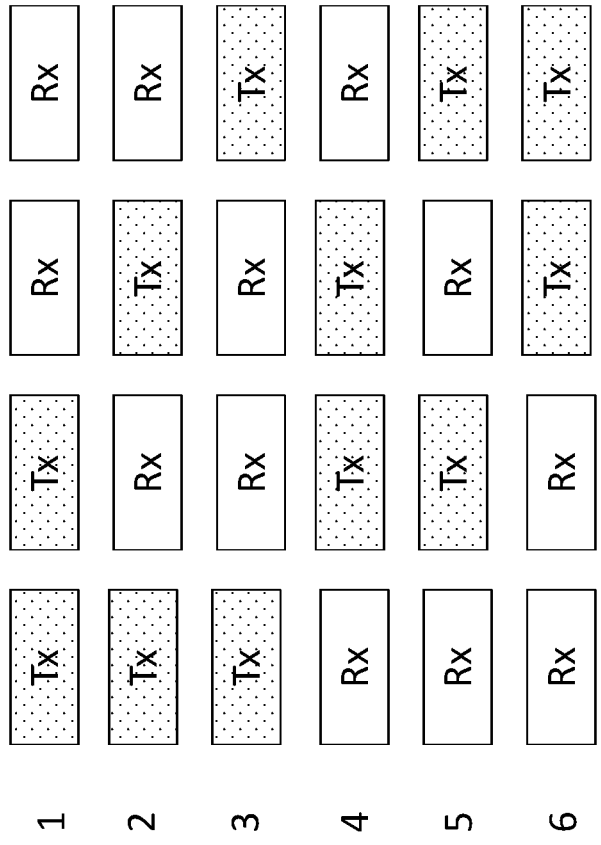
FIG. 6 shows example transmission patterns.

3GPP groups have proposed that, for Stage 2 discovery, an IAB network access apparatus can be configured with four SSB measurement time configurations (SMTCs) and four SSB transmission configurations (STCs). A SMTC window is characterized by periodicity, offset, duration and SSB indexes to measure. In addition, the measured cell IDs may be configured. For each STC, frequency, subcarrier spacing, transmission periodicity, timing offset, and SSB indexes to transmit are given. With four SMTCs and four STCs, SSB transmit/receive patterns can be configured that allow mutual discovery for a set of $(^8_4)=70$ network access apparatuses. FIG. 6 illustrates an example of six SSB transmit/receive patterns with two TX and two RX windows.

FIG. 6 shows six transmit/receive patterns that each comprise two transmit time windows and two receive time windows. In the first pattern, the first two time windows are for transmissions and the last two time windows are for receptions. In the second pattern, the first and third time windows are for transmissions and the second and fourth time windows are for reception. For the third pattern, the first and fourth time windows are for transmissions and the second and third time windows are for receptions. In the fourth pattern, the second and third time windows are for transmissions and the first and fourth time windows are for receptions. In the fifth pattern, the second and fourth time windows are for transmissions and the first and third time windows are for receptions. Finally, for the sixth pattern, the third and fourth time windows are for transmissions and the first and second time windows are for receptions.

Each time window may correspond, for example, to a half-frame during which a network access apparatus either transmits or receives SSBs (e.g. for up-to 64 beams).

As mentioned about, for NR Rel. 16 specification it was assumed that IAB network access apparatuses are stationary. Moving IAB network access apparatuses will likely be a topic of future releases.

Figure 7:
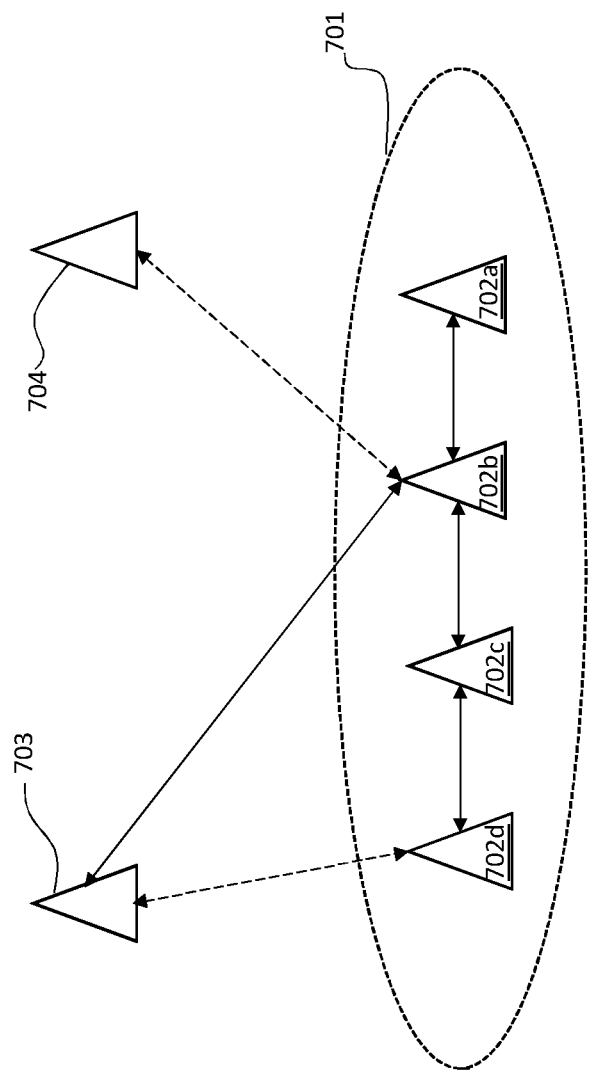
FIG. 7 shows a schematic diagram of an example communication network.

FIG. 7 schematically illustrates an example architecture having moving access points/IAB network access apparatuses. In this case, a single access point in a plurality of access points provides a backhaul connection to the core network or to the wired network.

FIG. 7 shows a group 701 of access points 702*a*-702*d* that are moving together with a velocity, v. Each access point 702*a*-702*d* is shown having a connection to another access point in the group 701 that is physically closest to said access point. One of these access points 702*b* comprises a backhaul connection to a stationary network access apparatus 703. Access point 702*b* may also determine information about a potential connection with stationary network access apparatus 704 for providing a backhaul connection to the wired network or to the core network. Access point 702*d* is also shown as having a potential connection with a stationary network access apparatus (stationary network access apparatus 703) for providing a backhaul connection to the core network, and measurements may be made in relation to this potential connection to determine the suitability of the connection for this purpose.

Although this example configuration assumes that only one of the access points travelling together is configured for providing a backhaul connection to the fixed network, it is understood that more than one of the travelling access points in the group 701 may provide a backhaul connection to the fixed/core network. This provision may be simultaneous with the provision of a backhaul connection with at least one other of the travelling access points in the group 701 (for example, for dual connectivity). Further, besides those access points actively providing a backhaul connection, all or some of the mobile access points in the group may be configured to measure SSBs of stationary network access apparatuses. Measurement results from such measurements may be collected for the mobile access point(s) that provide the backhaul connection to the fixed network.

Current 3GPP specifications comprise enough transmit/receive patterns for simple reuse scheme for stationary network access apparatus configurations. However, with mobile network access apparatuses there is the problem that the transmit/receive patterns of mobile network access apparatuses may need to be changed frequently to be compatible with the patterns of the surrounding network access apparatuses. Such continuous reconfiguration of transmit/receive patterns according to moving network access apparatuses position among the stationary network access apparatuses may result in a high complexity and signaling load. Therefore it may be difficult to perform discovery and/or discovery-related measurements when mobile network access apparatuses are factored into the network configuration.

Further, previous 3GPP systems do not consider what effect having a moving network access apparatus functioning as a relay would have on discovery-related measurements. For example, in LTE, with User Equipment-to-network relaying, mobile User Equipment relays measure and report measurement results like non-relay User Equipments. However, this system does not have support for multi-hop backhauling. Instead, all relays are connected to an access point having a wired connection to the core network, such as an LTE eNB. Furthermore, LTE does not support beam-based operation with cell discovery based on beam sweeping. LTE specification does not address any problems related to the presence of mobile IAB network access apparatuses in a communication network.

The following thus considers techniques for providing measurement opportunities between the mobile and stationary network access apparatuses/access points.

In general, the following techniques share the same corresponding technical features in that they all configure a network apparatus to use a first transmit and/or receive pattern selected from a plurality of available transmit and/or receive patterns for making measurements for and/or performing discovery procedures with another network apparatus. The first transmit and/or receive pattern is selected from said plurality in dependence on at least the mobility of the network apparatus and/or on the relative mobility of said network apparatus to the other network apparatus.

This means that, when the network apparatus is a stationary network apparatus, the stationary network apparatus may select a different transmit and/or receive pattern for making measurements and/or performing discovery using resources used by another stationary network apparatus compared to if it were going to make measurements and/or perform discovery using resources used by a mobile/moving network apparatus. Similarly, when the network apparatus is a mobile/moving network apparatus configured for discovery and measurements with stationary network apparatus, the mobile network apparatus may use a transmit and/or receive pattern from a set of patterns not used by those stationary network apparatuses that may provide backhaul connection for a mobile network apparatus. On the other hand, if a mobile network apparatus does not need to discover stationary network apparatuses, its pattern can be selected more freely, as transmit and/or receive patterns used wholly by stationary network apparatuses are also available in this case. Similarly, if a stationary network apparatus does not need not be discovered by mobile network apparatuses, there is no limitation for its pattern selection. For clarity, it is understood that the following references to "making measurements" includes those measurements made for performing discovery procedures, and references to "discovery procedures" includes those cases in which measurements that may be used for discovery procedures are made.

The following provides specific examples of this, before some general principles are discussed.

As a first example, the available SSB transmit/receive patterns may be divided in two groups. At least one transmit/receive pattern from the first group is allocated to at least one stationary network access apparatus that is available for discovery by at least one mobile network access apparatus. At least one transmit/receive pattern from the second group is allocated to at least one mobile network access apparatus that is configured to discover stationary network access apparatuses.

The pattern for the second group may be used by the mobile network access apparatus to perform measurements on at least one stationary network access apparatus for link management/discovery purposes. Group patterns from the first group may be reused for stationary network access apparatuses as if there were no mobile network access apparatuses in the system. In this latter case, the only difference compared with Rel-16 systems would be that slightly smaller number of patterns would be available for reuse.

A group pattern from the second group for a mobile network access apparatus does not need to be changed whilst the network access apparatus moves because it allows measuring SSBs of the stationary network access apparatuses that are using any first group pattern. Mobile network access apparatuses that are not configured to discover or be discovered by stationary network access apparatuses may select or be configured with a transmit/receive pattern from either group. The pattern of a mobile network access apparatus that need not discover stationary network access apparatuses does not need to be changed while the network access apparatus moves: the pattern may be chosen to allow mutual discovery with network access apparatuses that are travelling together with it.

There may be stationary network apparatuses that need not discover or be discovered by mobile network apparatuses. Such stationary nodes may be configured with a pattern from either group.

This example system may be implemented without any changes to NR Rel. 16. This is because the pattern grouping is purely an implementation issue. This is discussed in relation to FIG. 8.

Figure 8:
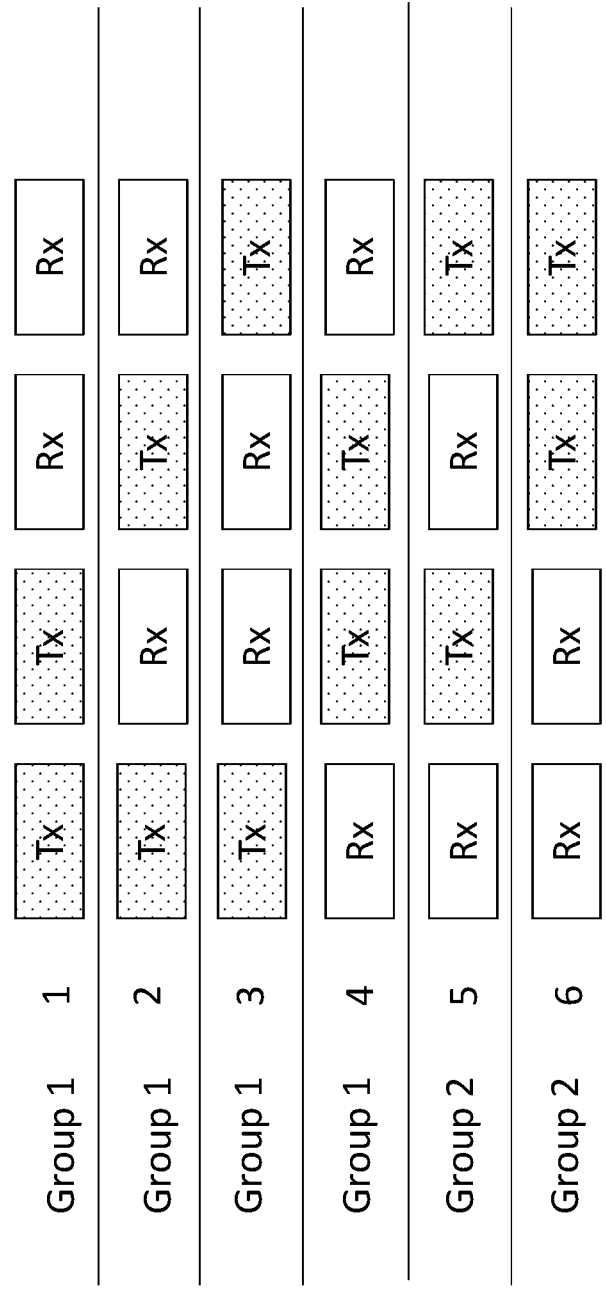
FIGS. 8 and 9 show example transmission configurations.

FIG. 8 illustrates an example of six SSB transmit/receive patterns with two TX and two RX windows.

FIG. 8 shows six transmit/receive patterns that each comprise two transmit time windows and two receive time windows. In the first pattern, the first two time windows are for transmissions and the last two time windows are for receptions. In the second pattern, the first and third time windows are for transmissions and the second and fourth time windows are for reception. For the third pattern, the first and fourth time windows are for transmissions and the second and third time windows are for receptions. In the fourth pattern, the second and third time windows are for transmissions and the first and fourth time windows are for receptions. In the fifth pattern, the second and fourth time windows are for transmissions and the first and third time windows are for receptions. Finally, for the sixth pattern, the third and fourth time windows are for transmissions and the first and second time windows are for receptions.

Each time window may correspond, for example, to a half-frame during which a network access apparatus either transmits or receives SSBs.

The first four transmit/receive patterns correspond to patterns allocatable to/selectable by the first group (i.e. by stationary network access apparatuses discoverable by other network access apparatuses, and by mobile network access apparatuses that are not configured to discover stationary network access apparatuses). The last two transmit/receive patterns correspond to patterns allocatable to/selectable by the second group (i.e. by mobile network access apparatuses).

Two network access apparatuses travelling together may be allocated with different patterns from the second group. This would mean that both network access apparatuses could measure each other's SSBs, and in addition discover (or be discovered) by stationary network access apparatuses allocated with patterns from Group 1.

As a second example, mobile network access apparatuses configured for discovering stationary network access apparatuses may be configured to use an SSB RX pattern for discovering stationary network access apparatuses. For mutual discovery between network access apparatuses travelling together (e.g. network access apparatuses of a train), TX-RX patterns on resources orthogonal (in time) to those of stationary network access apparatuses may be configured.

Figure 9:

This example may mean that the current NR specification may be altered to introduce a special RX pattern for discovering stationary network access apparatuses and a TX-RX pattern for measurements within the group of network access apparatuses travelling together. The special RX pattern may include more RX opportunities than the TX-RX patterns of the stationary network access apparatuses. This is illustrated with respect to FIG. 9, which shows a pattern in which all of the time windows are configured for reception. It is understood that this is merely one example, and that any increase in the reception time windows may be used.

For both of these examples, only a relatively small number of patterns would be reserved for discovery-related measurement purposes. For example, with respect to the first example, it would not matter if two mobile network access apparatuses with the same TX-RX pattern that are not travelling together come close to each other as they would not need to discover each other. As per the second example, the number of patterns (and the corresponding time domain resources) needed for measurements within the network access apparatuses travelling together would likewise be small. The number of reserved resources may be limited to only as many as needed for mutual discovery and measurements between network access apparatuses travelling together.

As another example, instead of having "all RX" for network access apparatuses travelling together (or having similar patterns in both Group 1 and Group 2), it is possible to configure TX-RX patterns for Group 2 that have fewer transmission windows compared to patterns of Group 1. For example, a second group of network apparatuses (travelling together) may be configured with TX-RX patterns having only one TX window. This may still provide for discovery between TX-RX patterns as shown in FIG. 12.

Figure 12:
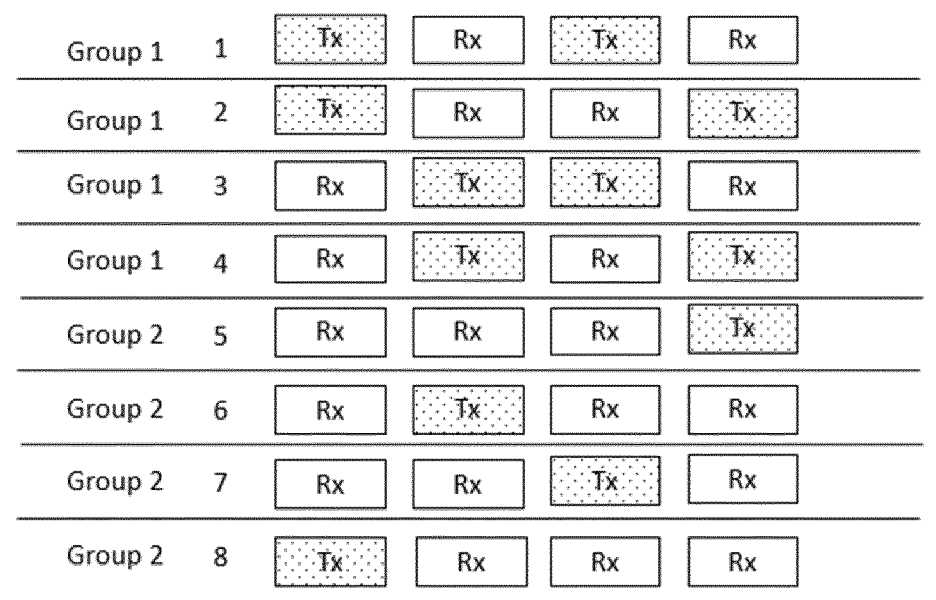

FIG. 12 shows 8 TX-RX patterns, the first four of which being categorized as being a first group and the last four of which being categorized as being in a second group. TX-RX patterns in the first group each have two receive windows and two transmit windows (e.g. a ratio of 1:1 receive window to transmit window). TX-RX patterns in the second group each have three receive windows and one transmit window (e.g. a ratio of 3:1 receive window to transmit window).

It is understood that FIG. 12 is simply one possible example of the distribution of TX-Rx patterns. For example, there may be 10 Tx-Rx patterns, the first six of which being categorized as being a first group, and the last four of which being categorized as being in a second group. The Tx-Rx patterns may be arranged such that the Tx-Rx patterns with the most receive windows (potentially including all receive windows) may be more likely to be part of the second group than part of the first group.

Such a grouping of patterns would enable a full discovery within Group 1, a full discovery within Group 2, and the use of the Group 2 pattern to allow discovery of every Group 1 pattern. The benefit of such an approach would be that it may increase the number of patterns available for Group 2 without reducing the opportunities for bi-directional discovery between TX-RX patterns among Group 1 and Group 2.

For all these examples, the transmit/receive pattern configuration may be provided by a donor network apparatus. For example, the network may update the measurement configuration of the mobile network access apparatus based on, for example, measurement results made previously. This means that when a mobile network access apparatus reports having observed a stationary network access apparatus, the network may change the SMTCs and Physical Cell Identity lists for discovery of other network access apparatuses in the vicinity. As discussed in the above, SMTC changes according to location do not have to be performed for any of the above-mentioned examples if the transmit/receive patterns are network widely configured with the same parameters. However, SMTC's may be configured for optimizing the reception according to the TX patterns of nearby stationary network access apparatuses.

The configuration by the network may be performed by a centralized unit of an access point of a network that knows the local SSB pattern(s) and SSBs of the stationary network.

In both of the above-mentioned examples, the mobile network access apparatus that is configured to perform a discovery operation (e.g. a mobile network access apparatus configured to provide a backhaul connection to the core/wired network) is always configured with a particular transmit and/or receive pattern. Therefore, the configuration may be performed only for a mobile IAB network access apparatus having a backhaul connection to a network.

Measurement results may be collected/shared with the network access apparatuses having backhaul connection. These network access apparatuses may use these measurement results for faster downlink synchronization at that network access apparatus to the candidate parent network access apparatus. The results may be shared over internal backhaul connections. For example, the results may be exchanged with layer 2 control protocol data units that do not have RRC and centralized unit involvement.

If RRC protocols were used, the centralized unit of the stationary network apparatus may configure all network access apparatuses in dependence on whether they're moving or not, and group the moving network access apparatuses.

It is understood that other signaling options for configuring the network apparatuses, that are not explicitly described above, are not excluded.

The formation of the group of network access apparatuses moving together and the roles performed by each apparatus within that group (e.g. which entity is configured to provide a backhaul connection to the fixed network access apparatuses, which network access apparatus(es) will perform discovery of the stationary network access apparatuses, etc.) may be configured in a number of different ways. For example, these roles may be subscription based, configured by an Operation Administration and Management (OAM) Function, or manually configured during the deployment.

In one example, IAB network access apparatuses capable for cell discovery are located in the front section of the train. At least one backhaul connection to a fixed network may be provided via IAB network access apparatus(es) located in the rear section of the train.

Some network apparatuses ("Measuring network access apparatuses") in this train may be configured for network access apparatus discovery. The measuring network access apparatuses may consequently provide results to at least one network access apparatus providing a backhaul connection to the wired/core network for that at least one network access apparatus to synchronise with candidate parent network access apparatuses that have been measured. The candidate parent network access apparatuses may be prepared enough for a backhaul change (e.g. a change in the mobile network apparatus in the train that is configured to provide the backhaul connection to the wired/core network, which is a form of handover), or for dual connectivity purposes, where multiple mobile network apparatuses in the train may be configured to provide the backhaul connection to the core network.

The measuring process may be performed continuously while the SSB monitoring pattern changes as the train is moving through the cells with fixed deployment.

Figures 10, 11:
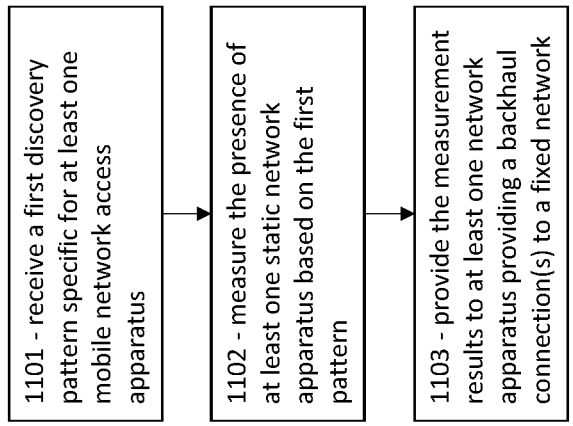
FIGS. 10 and 11 are flowcharts of example operations performed by example network apparatus.

FIGS. 10 and 11 are flow charts of example operations performed by network apparatuses.

At 1001, the network apparatus configures means for configuring the network apparatus to use a first transmit and/or receive pattern selected from a plurality of available transmit and/or receive patterns for performing discovery procedures with another network apparatus, wherein the first transmit and/or receive pattern is selected from said plurality in dependence on at least the mobility of said network apparatus and/or on the relative mobility of said network apparatus to said another network apparatus.

The network apparatus may be a mobile network access apparatus and the another network apparatus may be a stationary network apparatus. The mobile network access apparatus may be currently moving while the stationary network apparatus is static. The network apparatus may further comprise: means for measuring the presence of at least one stationary network apparatus using said first transmit and/or receive pattern to obtain at least one measurement result; and means for providing the at least one measurement result to the core network apparatus. The network apparatus may further comprise: means for providing a backhaul connection to the core network, and wherein said means for providing comprises means for providing the at least one measurement result directly to a stationary network apparatus facilitating the backhaul connection to the core network.

The network apparatus may be a mobile network access apparatus and the first transmit and/or receive pattern may comprise only receive time windows. The network apparatus may be currently moving.

Said means for providing may comprise means for providing the at least one measurement result to a mobile network apparatus providing a backhaul connection to the core network.

The network apparatus may be a mobile network access apparatus and the first transmit and/or receive pattern may have time resources that are orthogonal to time resources in a transmit and/or receive pattern used by the another network apparatus. The network apparatus may further comprise: means for measuring a presence of mobile network apparatuses travelling as part of a group; and means for providing the measurement results to at least one network apparatus configured to provide the backhaul connection to the core network.

The network apparatus may be a stationary network apparatus and the another network apparatus may be a mobile network apparatus. The network apparatus may further comprise: means for providing a backhaul connection to the core network; and means for receiving at least one measurement result directly from a mobile network apparatus facilitating the backhaul connection to a core network.

The network apparatus may further comprise means for receiving an indication of the first transmit and/or receive pattern from a core network apparatus. This indication may configure the network apparatus to use the first transmit and/or receive pattern.

To this effect, there is further disclosed an apparatus that may configure the network apparatus with the first transmit and/or receive pattern.

In this case, there is provided a network apparatus configured to a first transmit and/or receive pattern from a plurality of available transmit and/or receive patterns for a second network apparatus performing discovery procedures with a network apparatus, wherein the first transmit and/or receive pattern is selected from said plurality in dependence on at least the mobility of said network apparatus and/or on the relative mobility of said network apparatus to said another network apparatus. The network apparatus may be arranged to configure the second network apparatus with said first transmit and/or receive pattern. This may be achieved by transmitting at least an indication of the first transmit and/or receive pattern to the second network apparatus. The first transmit and/or receive pattern may be as discussed above.

With respect to FIG. 11, at 1101 a network apparatus may be configured receiving a first discovery pattern specific for at least one mobile network access apparatus.

At 1102, the network apparatus may be configured to measure the presence of at least one static network apparatus based on the first pattern.

At 1103, the network apparatus may be configured to provide the measurement results to at least one network apparatus providing a backhaul connection(s) to a fixed network.

The at least one mobile network access apparatus may be configured with at least one synchronisation signal block transmission configuration different and/or orthogonal to at least one synchronisation signal block transmission configuration used by the fixed network. The configured at least one synchronisation signal block transmission configuration may be part of a second discovery pattern used for measuring the presence of other mobile network access apparatuses travelling together; the network apparatus further comprising: means for measuring the presence of other mobile network access apparatuses travelling together based on the second discovery pattern to produce measurement results; and means for providing the measurement results to the at least one network apparatus providing the backhaul connection(s) to the fixed network. The first discovery pattern may be all receive time slots.

The at least one mobile network access apparatus may be configured with at least one synchronisation signal block transmission configuration pattern specific for mobile network access apparatus.

It should be understood that each block of the flowchart of the Figures and any combination thereof may be implemented by various means or their combinations, such as hardware, software, firmware, one or more processors and/or circuitry.

It is noted that whilst examples have been described in relation to one example of a standalone 5G, similar principles may be applied in relation to other examples of standalone 3G, LTE or 5G networks. It should be noted that other examples may be based on other cellular technology other than LTE, NR or on variants of both. Therefore, although certain examples were described above by way of example with reference to certain example architectures for wireless networks, technologies and standards, examples may be applied to any other suitable forms of communication systems than those illustrated and described herein.

It is also noted herein that while the above describes examples, there are several variations and modifications which may be made to the disclosed solution without departing from the scope of the present claims.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various examples may be implemented in hardware or special purpose circuits, software, logic or any combination thereof. Some aspects of the described may be implemented in hardware, while other aspects may be implemented in firmware or software which may be executed by a controller, microprocessor or other computing device, although the claimed is not limited thereto. While various aspects of the claimed may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out examples. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the above disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary example of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of the appended claims.

The invention claimed is:

1. A network apparatus, comprising:
at least one processor; and
at least one memory storing instructions that, when executed by the at least one processor, cause the apparatus at least to:
configure the network apparatus to use a first transmit pattern and a first receive pattern selected from a plurality of available transmit and receive patterns for performing discovery procedures with another network apparatus, wherein the first transmit pattern and the first receive pattern are selected from said plurality in dependence on at least the mobility of said network apparatus and on the relative mobility of said network apparatus to said another network apparatus,
wherein the first receive pattern comprises only receive time windows, and
wherein the first transmit pattern comprises a smaller number of transmit time windows when the network apparatus is mobile compared to when the network apparatus is stationary, and wherein the first transmit pattern comprises a larger number of transmit time windows when the network apparatus is stationary compared to when the network apparatus is mobile.

2. The network apparatus as claimed in claim 1, wherein the network apparatus comprises a mobile network access apparatus and the another network apparatus comprises a stationary network apparatus,
wherein the mobile network access apparatus is configured with at least one synchronization signal block transmission configuration different and orthogonal to at least one synchronization signal block transmission configuration used by the fixed network, and
wherein the configured at least one synchronization signal block transmission configuration is part of a second discovery pattern used for measuring the presence of other mobile network access apparatuses travelling together.

3. The network apparatus as claimed in claim 2, wherein the network apparatus is further configured to:
measure the presence of at least one stationary network apparatus using said first transmit pattern and said first receive pattern to obtain at least one measurement result; and provide at least one measurement result to a network apparatus configured to provide a backhaul connection to a fixed network,
wherein the measuring is performed continuously while a monitoring pattern changes, and
the network apparatus is further configured to, upon measuring the presence of at least one stationary network apparatus, change SSB based measurement timing configurations (SMTCs) and Physical Cell Identify lists for discovery of other network access apparatuses in the vicinity.

4. The network apparatus as claimed in claim 3, wherein the network apparatus is further configured to:
provide a backhaul connection to the fixed network, and providing the at least one measurement result directly to a stationary network apparatus facilitating the backhaul connection to a core network.

5. The network apparatus as claimed in claim 3, wherein the network apparatus is further configured to provide the at least one measurement result to a mobile network apparatus providing a backhaul connection to the fixed network.

6. The network apparatus as claimed in claim 1, wherein the network apparatus comprises a mobile network access apparatus and wherein the first transmit pattern and the first receive pattern are different from a transmit pattern and a receive pattern used by the another network apparatus.

7. The network apparatus as claimed in claim 6, wherein the network apparatus is further configured to:
measure a presence of mobile network apparatuses travelling as part of a group; and
provide the measurement results to at least one network apparatus configured to provide a backhaul connection to the fixed network,
wherein the backhaul connection is subscription based, configured by an Operation Administration and Management Function, or configured during deployment.

8. The network apparatus as claimed in claim 6, wherein each of the first transmit pattern and the first receive pattern has time resources that are orthogonal to time resources in a transmit pattern and a receive pattern used by a stationary network apparatus providing a backhaul connection to the fixed network.

9. The network apparatus as claimed in claim 1, wherein the network apparatus comprises a stationary network apparatus and the another network apparatus comprises a mobile network apparatus.

10. The network apparatus as claimed in claim 1, wherein the apparatus is further configured to receive an indication of the first transmit pattern and the first receive pattern from a donor network apparatus.

11. The network apparatus as claimed in claim 1, wherein the apparatus is further configured to:
provide a backhaul connection to a fixed network; and
receive at least one measurement result directly from a mobile network apparatus.

12. A network apparatus, comprising:
at least one processor; and
at least one memory storing instructions that, when executed by the at least one processor, cause the apparatus at least to:
select a first transmit and/or receive pattern from a plurality of available transmit and/or receive patterns for a second network apparatus performing discovery procedures with a network apparatus, wherein the first transmit and/or receive pattern is selected from said plurality in dependence on at least the mobility of said network apparatus and/or on the relative mobility of said network apparatus to said another network apparatus; and
configure the second network apparatus with said first transmit and/or receive pattern.

13. The network apparatus as claimed in claim 12, wherein the apparatus is further configured to:
provide a backhaul connection to a fixed network; and
receive at least one measurement result directly from a mobile network apparatus,
wherein the at least one measurement result is based on a first discovery pattern specific for a mobile network access apparatus and the presence of at least one static network apparatus based on the discovery pattern.

14. The network apparatus as claimed in claim 13, wherein the first transmit and/or receive pattern comprises a smaller number of transmit time windows when the network apparatus is mobile compared to when the network apparatus is stationary, and wherein the first transmit and/or receive pattern comprises a larger number of transmit time windows when the network apparatus is stationary compared to when the network apparatus is mobile.

15. The network apparatus as claimed in claim 14, wherein the at least one mobile network access apparatus is configured with at least one synchronization signal block transmission configuration different and orthogonal to at least one synchronization signal block transmission configuration used by the fixed network, and wherein the configured at least one synchronization signal block transmission configuration is part of a second discovery pattern used for measuring the presence of other mobile network access apparatuses travelling together.

16. An apparatus, comprising:
at least one processor; and
at least one memory storing instructions that, when executed by the at least one processor, cause the apparatus at least to:
receive a first discovery pattern specific for at least one mobile network access apparatus;
measure the presence of at least one static network apparatus based on the first discovery pattern; and
transmit the measurement results to at least one network apparatus providing a backhaul connection to a fixed network,
wherein the at least one mobile network access apparatus is configured with at least one synchronization signal block transmission configuration different and orthogonal to at least one synchronization signal block transmission configuration used by the fixed network,
wherein the configured at least one synchronization signal block transmission configuration is part of a second discovery pattern used for measuring the presence of other mobile network access apparatuses travelling together.

17. The apparatus as claimed in claim 16, the apparatus further configured to:
measure the presence of other mobile network access apparatuses travelling together based on the second discovery pattern to produce measurement results; and
provide the measurement results to the at least one network apparatus providing the backhaul connection to the fixed network,
wherein the first discovery pattern comprises all receive time slots.

18. The apparatus as claimed in claim 17, wherein the at least one mobile network apparatus is configured with at least one synchronization signal block transmission configuration pattern specific for the mobile network access apparatus.

* * * * *